Patented Apr. 21, 1936

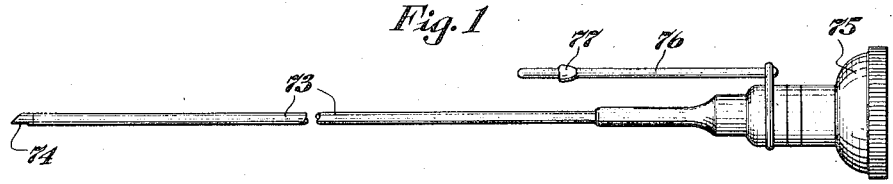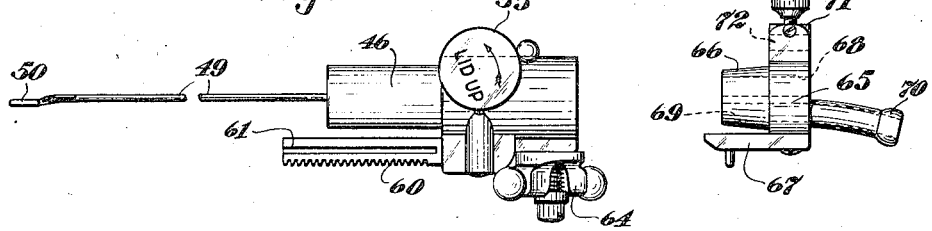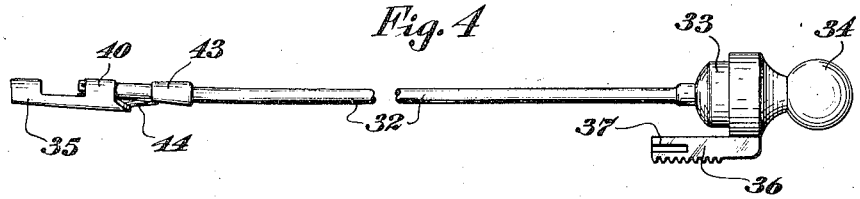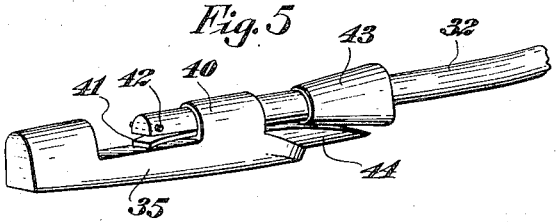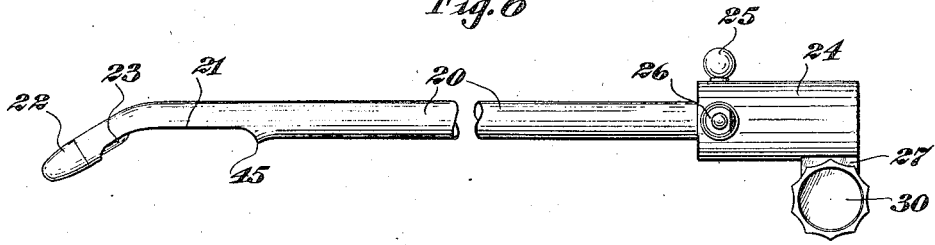

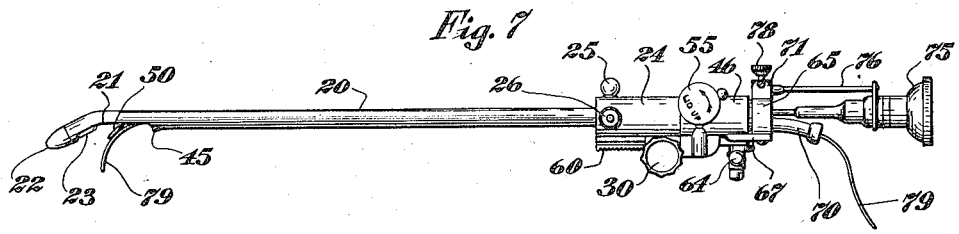
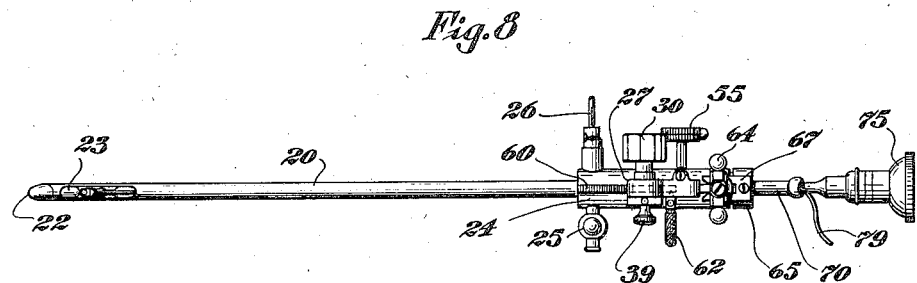
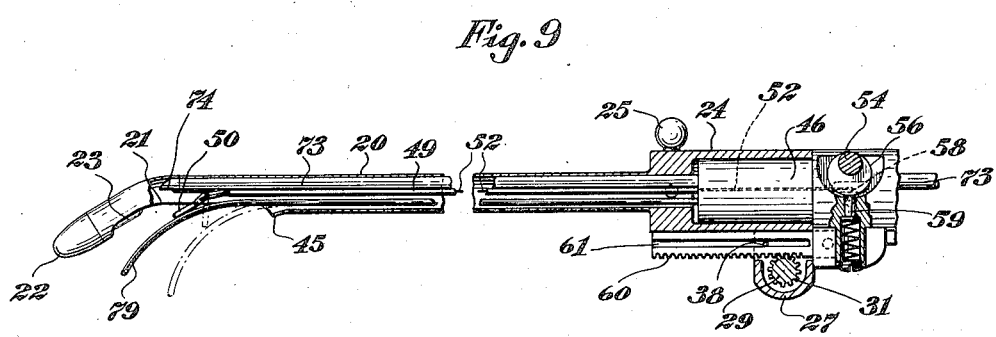
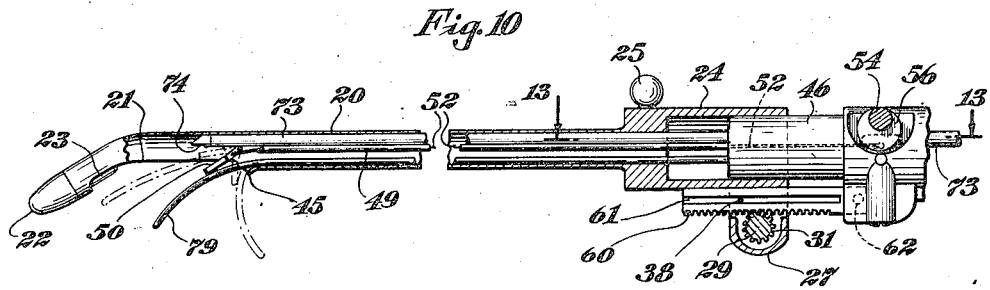

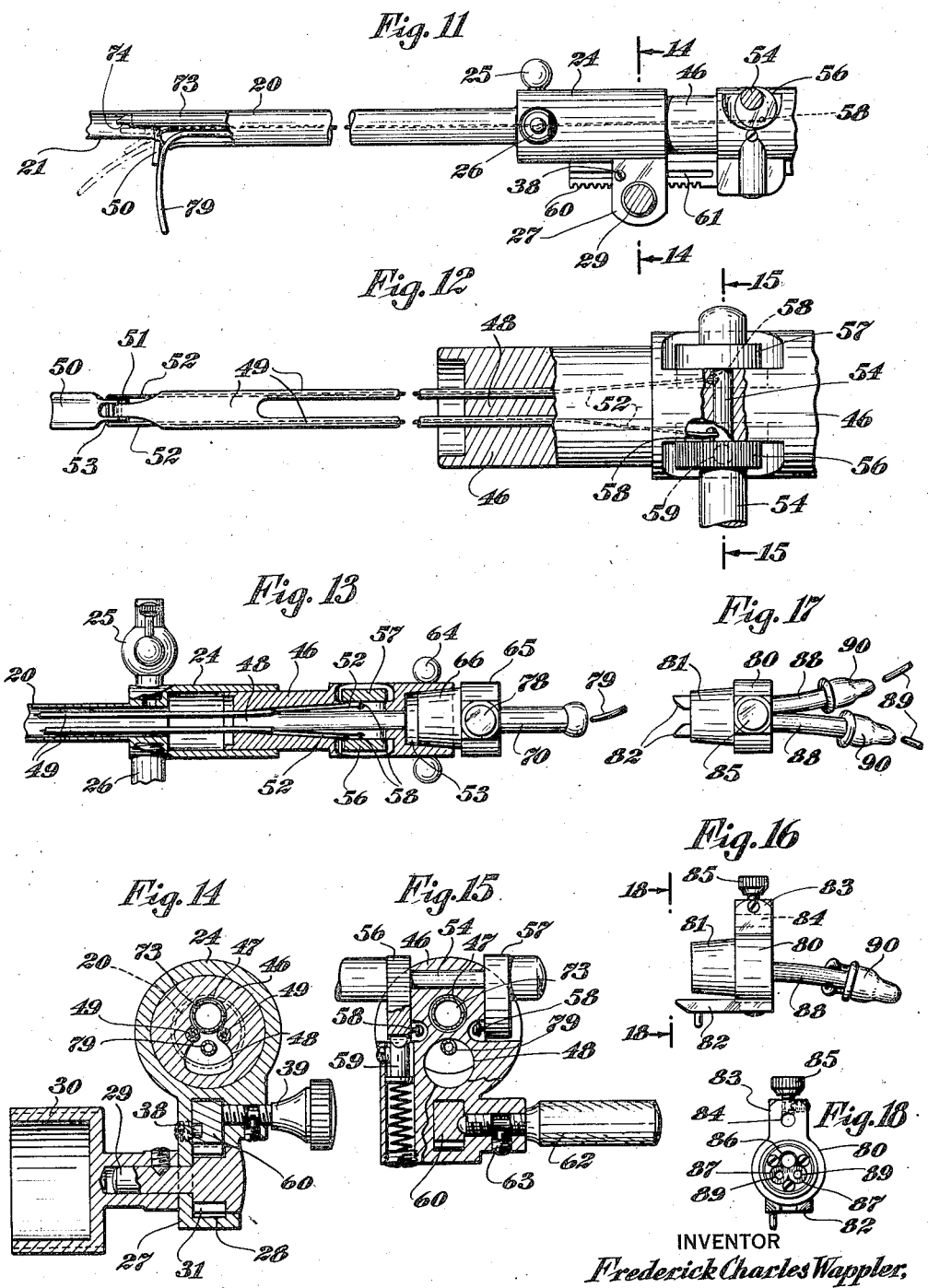

2,038,394

UNITED STATES PATENT OFFICE 2,038,394

CATHETERIZING INSTRUMENT

Frederick Charles Wappler, New York, N. Y.

Application October 28, 1933, Serial No. 695,561

6 Claims. (Cl. 128—349)

My present invention relates generally to surgical instruments, and has particular reference to a new and improved type of catheterizing cystoscope or the like.

It is a general object of my invention to provide an instrument which permits a more accurate and improved control of the insertion into the inner cavities of the body of a catheter or similar operating tool.

A further object is to provide an instrument whereby a catheter, bougie, or the like may be manipulated and controlled throughout a greater range of action. More particularly, the instrument includes a laterally fenestrated endoscopic tube which permits a portion of an interior cavity to be exposed through the fenestra, in combination with mechanism and control means for permitting a catheter or the like to be deflected and guided toward any part of a relatively large area of the exposed cavity wall.

In accordance with my invention, the manipulation and guidance of the catheter is under maintained illuminated vision.

Another general object of my invention is to provide a device having the foregoing capabilities and which is nevertheless of extreme compactness to permit it to be used in connection with body channels of relatively small cross-section. The instrument is further designed in a manner which makes it relatively simple and inexpensive to manufacture, easy to use, and readily capable of disassembly for purposes of sterilization or the like.

Briefly, an instrument constructed in accordance with the present invention comprises an endoscopic tube with a lateral fenestra, a pivotable catheter deflector at the fenestra and mounted on the forward end of a supporting stem, a telescope commanding a view of the deflector, a means for pivoting the deflector from the rear portion of the instrument, and a means for moving the deflector and the telescope bodily and in unison in a longitudinal direction. The instrument is constructed in such a way that the inner portion of the endoscopic tube is maintained in a liquid-tight condition during all manipulations of the control mechanisms and parts.

Further features of my invention lie in the manner of constructing and assembling the parts, whereby the instrument may be adapted for use with either one or a plurality of catheters or the like, and whereby a specially constructed obturator may be associated with the instrument in an efficient and simple manner during the initial insertion thereof into a cavity.

I achieve the foregoing objects, and such other objects as may hereinafter appear or be pointed out, in the manner illustratively exemplified in the accompanying drawings, wherein—

Figure 1 is a side view of the telescope forming part of my present instrument;

Figure 2 is a similar view of the plug element and associated parts;

Figure 3 is a similar view of one type of member to be applied to the rear of the plug element;

Figure 4 is a similar view of an obturator for use with the present instrument;

Figure 5 is a perspective view of the forward end of the obturator;

Figure 6 is a view similar to Figures 1, 2, and 3, showing the endoscopic tube portion of the present instrument;

Figure 7 is a side view of the instrument in assembled condition, showing one manner of use;

Figure 8 is a bottom view of Figure 7;

Figure 9 is a longitudinal section, showing the catheter deflector and telescope in a forward location;

Figure 10 is a view similar to Figure 9, showing the catheter deflector and telescope in a retracted position;

Figure 11 is a view similar to Figure 10 with the deflector pivoted to a greater angle;

Figure 12 is an enlarged plan view, partly in section, of the plug element of Figure 2;

Figure 13 is a cross-sectional view taken substantially along the line 13—13 of Figure 10, with certain parts omitted for the sake of clearness;

Figure 14 is an enlarged cross-sectional view taken substantially along the line 14—14 of Figure 11;

Figure 15 is an enlarged cross-sectional view taken substantially along the line 15—15 of Figure 12;

Figure 16 is a view similar to Figure 3, showing a modification;

Figure 17 is a plan view of Figure 16; and

Figure 18 is an end view taken substantially in the direction 18—18 of Figure 16.

The nature of the present instrument will best be understood by referring first to Figures 1-6, wherein I have shown the several parts entering into its construction.

The endoscopic tube or sheath 20 (Figure 6) is composed of any suitable material and may be of any suitable cross-section, and is provided near its forward end with the lateral elongated window or fenestra 21. Forwardly of the fenestra the tube is provided with a beak 22 which carries an illuminating lamp 23. In a preferred construction, the beak extends at an angle to the tube and in the direction of the fenestra 21, although in many instances it may be desirable to bend the beak in the opposite direction. At its rear end, the tube 20 terminates in an enlarged sleeve or tubular housing 24 which carries an irrigation petcock 25 and an electric binding post 26. Suitable wiring (not shown) extends from the binding post 26 to the lamp 23, whereby the establishment of suitable electrical connections will permit the lamp 23 to function when the instrument is used. The sleeve 24 also carries a lateral projection 27 in which a bore 28 of rectangular cross-section is provided (see Figure 14). Journaled in the projection 27 is the spindle 29 carrying a control knob 30 on its outer end and provided with a pinion 31 within the bore 28. Rotation of the knob 30 causes a rotation of the pinion 31 for a purpose presently to be described.

The sleeve 24 is also provided with a set screw 39.

In Figures 4 and 5, I have illustrated the obturator which is to be employed with the sheath 20 when the device is initially inserted into the body. The obturator comprises a shank 32, a plug portion 33 adapted to fit slidably into the rear end of the sleeve 24, a handle 34, and a forward head 35. Carried at the rear of the obturator is the forwardly projecting rack 36 which is adapted to extend forwardly through the upper portion of the bore 28 when the obturator is inserted into the tube 20. The teeth of the rack 36 are adapted to mesh with the teeth of the pinion 31, so that rotation of the knob 30 will cause an advancement and retraction of the obturator into and out of the tube 20. Preferably, the rack is provided with a longitudinal slot 37 adapted to engage slidably over the guide pin 38 which projects into the bore 28, as shown in Figure 14. The rack may be locked in any desired position by adjustment of the set screw 39.

The rear part of the head 35 is provided with the bearing 40 which engages slidably over the forward end of the shank 32. So that this slidable fit will be a snug one, the forward end of the shank 32 is slit, as at 41. The shank carries at its forward end a stop pin 42, and a little to the rear is provided a forwardly tapered collar 43. The head has a rearwardly extending tongue 44 adapted to engage in a wedging relationship with the tapered surface of the collar 43.

In normal condition, the obturator head 35 is in the forward relationship shown in Figure 4, in which condition the head is readily insertable into the tube 20. When the shank 32 is then advanced, by means of the rack-and-pinion assembly, the collar 43 advances forwardly and wedges the tongue 44 laterally, thereby forcing the head 35 laterally into snug disposition within the fenestra 21. When thus located, the outer surface of the head 35 forms a smooth continuation of the outer surface of the tube 20, thereby effectively blunting the rear edge 45 of the fenestra. When the obturator is to be withdrawn, the manipulation of the knob 30 causes the shank 32 to retract; and during the initial retraction the head 35 is permitted to spring back into its normal position, thereby permitting the further retraction of the shank 32 to effect a complete withdrawal of the obturator.

One of the operative portions of the instrument is illustrated in Figure 2, and consists of a cylindrical plug element 46 adapted to fit slidably into the sleeve 24, and provided with upper and lower bores 47 and 48, respectively, as shown most clearly in Figure 14. Secured to the plug element between these bores and in spaced relationship is the forwardly projecting supporting stem or shaft 49 which consists preferably of two relatively fine tubes, shown most clearly in Figures 12 and 13. At the extreme forward end of the stem 49 a catheter deflector in the form of a plate or movable member 50 is pivoted, as at 51, (see Figure 12). The pivotal movements of this deflector are controlled by a pair of control rods 52 articulated, as at 53, to the deflector 50 and extending rearwardly through the tubes which constitute the supporting stem 49. The advancement and retraction of the control rods 52 produce a pivotal movement (i. e., a raising and lowering) of the deflector, as indicated most clearly in Figure 11, in which the deflector is shown in full-lines at substantially right angles to the supporting stem, and is shown in dot-and-dash lines in other positions which it may be caused to assume.

The rear portion of the plug element 46 is provided with a relatively large and forwardly tapered bore 53 (Figure 13), this bore being in communication with the bores or passageways 47 and 48. It may be mentioned that the bore 48 enlarges somewhat and becomes circular in cross-section at its rear end, as will be observed by comparing Figures 14 and 15.

The plug element 46 carries a transversely journaled pin 54 which is rotatable by means of the control handle 55. This pin carries the two eccentrically mounted discs 56 and 57, the plug element being cut away to accommodate them, and these discs are articulated in any suitable manner to the rear ends of the control rods 52, e. g., by means of the pins 58. It is the rotation of the pin 54 which causes the longitudinal reciprocation of the control rods 52, it being understood that the pin 54 is rotated through only a relatively small arc to accomplish this purpose.

Preferably, though not necessarily, the disc 56 is knurled and there is provided a spring-pressed detent 59 in the plug element which bears constantly against the knurled surface of the disc, thereby serving yieldably to maintain the pin 54 in any desired angular position, and thereby facilitating the accurate control of the pivotal movements of the deflector 50.

The plug element 46 is provided with a forwardly projecting rack 60, similar to the rack 36 of the obturator but somewhat longer and provided with a longitudinal slot 61 similar to the slot 37. The rack 60 is preferably held in locked and permanent relationship to the plug element by means of the set screw 62 (Figure 15); this set screw being in turn locked against accidental loosening by means of the set screw 63.

The plug element 46 is further provided with the attachment device 64 which forms no part of the present invention and which serves merely to facilitate the engagement with the plug element 46 of the member illustrated in Figure 3.

The member 65 of Figure 3 is adapted to be applied to the rear end of the plug element 46 in a liquid-tight manner. With this object in view, it is provided with a forwardly tapered plug portion 66 which is adapted to fit snugly into the rear tapered bore 53, as shown most clearly in Figure 13. The member 65 carries a forwardly projection fork 67 which engages with the attachment device 64. The member 65 is provided with a longitudinal bore 68 adapted to permit the snug passage of the telescope shaft therethrough, and with the longitudinal bore 69 which is adapted to permit the passage of an operating tool, such as a catheter, therethrough. A rearwardly extending guide tube 70 has a bore which forms a continuation of the bore 69. The member 65 is further provided with a projection 71 in which a bore 72 is provided, this being for the purpose of accommodating a portion of the telescope in a manner presently to be described.

The telescope is illustrated most clearly in Figure 1, and consists of an elongated stem or shaft 73 at the forward end of which an objective lens 74 is provided, and at the rear end of which an eyepiece 75 is mounted. The internal optical construction of the telescope is not shown, but it will be understood that the objective 74 commands a substantially conical field of vision, the apex of which is closely adjacent to the objective 74, and the axis of which extends laterally so that the telescope commands a view of the deflector 50 when the parts are assembled. Carried by the rear portion of the telescope is a forwardly projecting pin 76 having a stop collar 77 adjacent to its forward end.

The manner of assembing the device is illustrated most clearly in Figures 7–10. The telescope is first inserted forwardly through the bore or guiding means 66 of the member 65. The forward portion of the pin 76 thus projects forwardly through the bore 72, and the collar 77 serves as a limit for the positioning of the telescope. The set screw 78 engages with the forward portion of the pin 76 when the telescope has been inserted to the desired degree. Within a narrow limit, the telescope may be adjusted longitudinally, independently of the other portions of the device, by means of engagement of the forward portion of the pin 76 in the bore 72.

The member 65, with the telescope secured thereto, is then inserted into the rear portion of the plug element 46. During this assembly, the telescope is caused to project forwardly through the bore 47 of the plug element 46; and the fork 67 engages and cooperates with the attachment device 64. The latter serves to wedge the plug portion 66 forwardly into liquid-tight association with the rear portion of the plug element 46. Thereafter, the plug element and the member 65, and all parts carried thereby, are bound together as a unit, whereby any movement of the plug 46 in the sheath 20 imparts a corresponding movement to the telescope and the deflector shaft 49.

When the three parts of Figures 1, 2 and 3 are thus assembled, the shaft 73 of the telescope lies closely adjacent to the supporting stem 49, and the objective 74 positions itself adjacent to and behind the deflector 50, an accurate adjustment of the exact relative positions of objective and deflector being initially made by means of the set screw 78.

This assembly is then inserted forwardly into the sheath of Figure 6, the plug element 46 entering into the housing or sleeve 24, and the rack 60 projecting into the rectangular bore 28 and meshing with the pinion 31.

In actual operation, it will be understood that the sheath of Figure 6 will have been initially inserted into the body cavity with the obturator of Figure 4 in association therewith; and that the assembly of parts shown in Figures 7–9 indicates the assembly which results after the entire device is in position within the body cavity.

With a suitable connection made with the terminal 26, so as to render the lamp 23 operative, a relatively large expanse of exposed cavity wall portion is rendered visible under illumination. The insertion of the operating tool, such as a catheter 79, may then be proceeded with, the catheter being projected forwardly through the guide tube 70 and bore 69, thence through the bore 48, the forward portion of the catheter ultimately projecting out of the fenestra 21 in a manner which permits it to be subjected to the deflecting action of the deflector 50.

The accurate controllability of the forward end of the catheter 79 is best illustrated in Figures 9–11. In Figure 9, the telescope and deflector are positioned forwardly to their full extent, this being accomplished by manipulating the knob 30 so that the rack 60 is advanced forwardly as far as it will go. In this relationship of parts, the telescope commands a field of vision at the forward or inner end of the exposed cavity wall portion. The catheter 79 may then be guided to any desired point by manipulating the control wheel 55, this wheel serving to pivot the deflector into any desired angular position. In full-lines in Figure 9, the deflector is shown guiding the catheter 79 into an obliquely forward portion forming an angle of approximately 45° with the axis of the instrument. In dot-and-dash lines, the deflector is shown guiding the catheter into a greater lateral position. The tip of the catheter is maintained under illuminated vision during all these manipulations.

Further controllability of catheter guidance is afforded by manipulation of the knob 30, which serves to move the deflector bodily, and with it the telescope, lengthwise of the window or fenestra 21. The knob 30 thus serves as a means for positioning the telescope lens and deflector member at various points along the length of the window. In Figures 10 and 11, for example, I have shown the parts in such a relationship. It is to be noted that the deflector is positioned nearer the rear edge of the fenestra, this having been accomplished by causing the rack 60 to move rearwardly under the actuation of the pinion 31. The plug portion 46 is still disposed within the sleeve 24, but is positioned rearwardly with respect to the relationship shown in Figure 9.

In full-lines in Figure 10 I have shown the deflector guiding the catheter into an angular relationship of approximately 45° to the instrument axis, but the tip of the catheter is obviously further to the rear than the tip shown in Figure 9. By swinging the deflector 50 into the upper dot-and-dash position of Figure 10, the catheter is permitted to project toward a point further to the front; and by swinging the deflector into the other dot-and-dash position of Figure 10 (i. e., into the full-line position of Figure 11), the catheter may be caused to be deflected into the extreme lateral position shown in full-lines in Figure 11. The extreme deflection illustrated in Figure 11 is facilitated by the proximity of the deflector to the rear edge of the fenestra, whereby the catheter is caused to bend sharply around this rear edge.

By rotating the instrument as a whole, further control of the catheter insertion is afforded, and, in general, it will be observed that the present instrumentality permits of an accurate guidance of a catheter or a similar device into a large variety of differing positions and angularities. More especially, I have provided a means for varying the angle between the operating end of a surgical operating tool and the sheath from 0° to 90°. Such a complete control of catheter movements is of decided advantage in the art, and it is to be noted that the catheter is in all cases maintained under illuminated vision.

The instrument is usable, also, with a pair of catheters or the like, the use of two catheters simultaneously being frequently desirable. In such a case, the member 65 of Figure 3 is merely replaced by the member 80 of Figures 17–18. This member has a forwardly projecting plug portion 81, a fork 82, a projection 83 with a bore 84 for the pin 76, and a set screw 85. The member 80 is further provided with a longitudinal bore 86 for the telescope shaft. In all the foregoing respects, the member 80 is similar to the member 65. Instead of being provided with a single bore 69 for the catheter, however, it is provided with two adjacent bores 87 and with two rearwardly projecting guide tubes 88, whereby two catheters 89 may be simultaneously inserted into the instrument. These two catheters project forwardly, side by side, through the bore 48 and through the sheath 20, and both of them are adapted to be subjected to the deflecting action of the deflector 50. It will be understood, however, that, usually, only one catheter is deflected at a time; and after having been properly positioned or inserted into an opening or the like, the other catheter is then ready for manipulation and guidance.

Before inserting a catheter or catheters, the rear ends of the guide tubes 88 are preferably capped by rubber nipples 90, and the same is true with respect to the guide tube 70 of Figure 3.

It will be understood that changes in the details, herein described and illustrated for the purpose of explaining the nature of my invention, may be made by those skilled in the art without departing from the spirit and scope of the invention as expressed in the appended claims. It is, therefore, intended that these details be interpreted as illustrative, and not in a limiting sense.

Having thus described my invention, and illustrated its use, what I claim as new and desire to secure by Letters Patent is—

1. In an instrument of the character described, a laterally fenestrated endoscopic tube terminating in a sleeve at its rear end, a pivotable catheter deflector at said fenestra, a supporting stem for the deflector extending rearwardly through the tube, a plug element mounted on the rear end of said stem and slidably mounted in said sleeve, the rear end of the plug element having a forwardly tapering bore therein, means carried by the plug element for pivoting the deflector, means for longitudinally moving the plug element in said sleeve, thereby moving the deflector bodily lengthwise along said fenestra, and a second plug element having a forwardly tapering portion adapted to enter into liquid-tight wedged relation with said tapering bore.

2. In an instrument of the character described, a laterally fenestrated endoscopic tube terminating in a sleeve at its rear end, a pivotable catheter deflector at said fenestra, a supporting stem for the deflector extending rearwardly through the tube, a plug element mounted on the rear end of said stem and slidably mounted in said sleeve, the rear end of the plug element having a forwardly tapering bore therein, means carried by the plug element for pivoting the deflector, means for longitudinally moving the plug element and hence the stem deflector, and a telescope carried by and movable with said plug and stem for commanding a view of said deflector, and a second plug element having a forwardly tapering portion adapted to enter into liquid-tight wedged relation with said tapering bore, said second plug element having a longitudinal bore adapted to permit passage therethrough of said telescope.

3. In an instrument of the character described, a laterally fenestrated endoscopic tube, an obturator having a shank and a laterally movable head at its forward end, a rack-and-pinion assembly operatively interposed between said tube and shank for moving the shank longitudinally, and means for automatically causing a lateral movement of the obturator head into plugging relation to said fenestra when the shank is forced inward, by the rack-and-pinion assembly, to its full extent.

4. In an instrument of the character described, a laterally fenestrated endoscopic tube terminating in a sleeve at its rear end, a pivotable catheter deflector at said fenestra, a supporting stem for the deflector extending rearwardly through the tube, a plug element mounted on the rear end of said stem and slidably mounted in said sleeve, the rear end of the plug element having a forwardly tapering bore therein, means carried by the plug element for pivoting the deflector, means for longitudinally moving the plug element in said sleeve, thereby moving the deflector bodily lengthwise along said fenestra, and a second plug element having a forwardly tapering portion adapted to enter into liquid-tight wedged relation with said tapering bore, said second plug element having longitudinal bores adapted to permit passage, respectively, of a catheter and a telescope.

5. In an instrument of the character described, a laterally fenestrated endoscopic tube terminating in a sleeve at its rear end, a pivotable catheter deflector at said fenestra, a supporting stem for the deflector extending rearwardly through the tube, a plug element mounted on the rear end of said stem and slidably mounted in said sleeve, the rear end of the plug element having a forwardly tapering bore therein, means carried by the plug element for pivoting the deflector, means for longitudinally moving the plug element and hence the stem and deflector, a telescope carried by and movable with said plug and stem for commanding a view of said deflector, and a second plug element having a forwardly tapering portion adapted to enter into liquid-tight wedged relation with said tapering bore, said second plug element having a longitudinal bore adapted to permit passage therethrough of said telescope, and said second plug element being provided with releasable means for engaging said telescope.

6. In an instrument of the character described, a laterally fenestrated endoscopic tube, an obturator having a shank and a laterally movable head at its forward end, a rack-and-pinion assembly operatively interposed between said tube and shank for moving the shank longitudinally, and means for automatically causing a lateral movement of the obturator head into plugging relation to said fenestra when the shank is forced inward, by the rack-and-pinion assembly, to its full extent, said head having a longitudinal bearing portion and a tapered tongue, said shank being slidably mounted in said bearing portion and provided with a wedge adapted to engage said tongue and cam the head laterally when the shank is advanced.

FREDERICK CHARLES WAPPLER.